Patented Oct. 13, 1925.

1,557,188

UNITED STATES PATENT OFFICE.

JAMES A. NEWLANDS, OF HARTFORD, CONNECTICUT.

PROCESS OF PURIFYING WASTE WATERS.

No Drawing.   Application filed January 19, 1921.   Serial No. 438,515.

*To all whom it may concern:*

Be it known that I, JAMES A. NEWLANDS, a citizen of the United States, residing at Hartford, county of Hartford, and State of Connecticut, have invented certain new and useful Improvements in Processes of Purifying Waste Waters, fully described and represented in the following specification.

This invention relates to an improved process of purifying waste waters to remove substances therefrom which would contaminate streams.

In many manufacturing processes, a resulting waste liquor is produced which contains very considerable amounts of sulphuric acid. In rubber manufacture, for instance, the waste liquors and wash waters from certain rubber regenerating plants contain considerable amounts of sulphuric acid. In the metal industries, particularly in the manufacture of brass, the waste liquors and wash waters from the pickling tanks contain considerable amounts of sulphuric acid. This pickling waste further contains some copper and zinc and frequently other metallic salts, such as iron, nickel and chromium. So-called "bright dip" wastes contain small amounts of nitric and hydrochloric acids in addition to sulphuric acid. The percentage of sulphuric acid in the waste liquors referred to, while relatively high, is still not sufficient to make it practical in most cases to recover the sulphuric acid as such.

As a rule, these waste sulphuric-acid-containing liquors are run into the streams. The result is to pollute the streams and to cause serious resulting damage. This has caused States and municipalities to pass ordinances which prevent the running of these sulphuric-acid-containing waste liquors into the streams. As in many instances, the volume of such liquors is very large the problem connected with their disposal has become serious.

The present invention has in view not only to utilize the sulphuric acid in the production of a useful product, but to do this in such a way that the remaining liquor or effluent is a clear water which may be run into the streams without danger of contaminating such streams.

According to this invention the waste liquors containing sulphuric acid are utilized in the production of lithopone. The process not only involves the utilization of the sulphuric acid, but the removal from the liquors of any substances they may contain which would impair the quality of the lithopone. Incidentally, in most instances, this removal of substances which would impair the quality of the lithopone also results in producing a clear final water or effluent.

In treating the waste sulphuric-acid-containing liquors, such as that obtained from rubber regenerating mills, the impurities are mainly in suspension and may be removed by proper filtration.

The sulphuric-acid-containing liquor resulting from pickling operations usually contains zinc, and also other metallic salts, such as copper, iron, nickel and chromium which would tend to impair the quality of the lithopone. Such salts should, therefore, be removed, and at the same time the free sulphuric acid should be neutralized by the addition of further zinc, the sulphuric acid combining with the zinc to produce sulphate of zinc. The amount of zinc to be added and the form in which it is added will depend upon the concentration of the acid and the character of the waste liquor. The zinc may be added in various forms, for instance, it may be added in the form of metallic zinc, or zinc oxid, or what is known as brass mill skimmings, or combinations of these forms of zinc may be added.

In carrying the invention into effect, and particularly with reference to the pickling bath liquors referred to, if the amount of free sulphuric acid is high, oxid of zinc or zinc skimmings may be added in the first instance. The liquor is then brought into contact with metallic zinc, as, for instance, by running it into tanks containing metallic zinc in wooden baskets. The free sulphuric acid will combine with the zinc to produce sulphate of zinc, and at the same time the copper precipitates as metallic copper. The copper is present in the liquor in the form of sulphate of copper but when the liquor is brought in contact with the zinc the copper precipitates as metallic copper and the sulphuric acid which was in combination with the copper, takes up zinc to form zinc sulphate. Where other metals, such as iron, nickel and chromium, occur in the waste liquors, they may be oxidized by means of a suitable agent, such as chlorine, precipitated with caustic soda or soda ash, and removed.

Barium sulphide is then added to the waste liquor containing the sulphate of zinc. To secure the most economical results, the proportion of barium added should be about 70 parts to about 30 parts of zinc. After the addition of the barium sulphide, the mixture of sulphate of zinc and sulphate of barium, i. e., lithopone, is removed either by settling or filtration, in accordance with well-known methods. The resulting water or effluent is free from substances which will cause contamination of the streams into which such water may be discharged.

The improved process not only settles any question of the disposal of the waste liquors referred to, but it presents many economies. This is particularly true of plants, such as brass mills, where considerable quantities of zinc oxid result from the fumes and where the pickling waste contains a considerable amount of sulphuric acid or sulphate of zinc.

I claim:

1. The process of purifying waste waters containing sulphuric acid, to prevent the contamination of streams, which consists in removing such impurities as tend to impair the quality of the resulting product, adding zinc to the liquor to produce sulphate of zinc, adding barium sulphides, and separating the resulting sulphide of zinc and sulphate of barium from the liquor.

2. The process of purifying waste waters containing sulphuric acid and metallic salts including zinc, to prevent the contamination of streams, which consists in adding zinc, removing the metallic salts other than zinc which tend to impair the quality of the resulting product, adding barium sulphide, and separating out the sulphide of zinc and the sulphate of barium from the liquor.

3. The process of purifying waste waters containing free sulphuric acid, zinc and copper, to prevent the contamination of streams, which consists in adding zinc to neutralize the free acids and to remove the copper, removing any metallic salts other than zinc which tend to impair the quality of the resulting product, adding barium sulphide to the purified zinc sulphate solution, and separating out the sulphide of zinc and the sulphate of barium from the liquor.

4. The process of purifying waste waters containing free sulphuric acid, zinc, copper, and other metallic salts, which consists in adding zinc to neutralize the free acids and to remove the copper, treating with an oxidizing agent and caustic soda to remove metallic salts other than zinc, adding barium sulphide to the purified zinc sulphate solution, and separating from the liquor the sulphide of zinc and the sulphate of barium.

5. The process of purifying waste waters containing free sulphuric acid, zinc, copper, and other metallic salts, which consists in adding zinc to neutralize the free acids and to remove the copper, treating with an oxidizing agent and caustic soda to precipitate metallic salts other than zinc, removing the precipitates to produce a purified zinc sulphate solution, adding barium sulphide to the purified zinc sulphate solution, and separating from the liquor the sulphide of zinc and the sulphate of barium.

6. The process of purifying waste waters from the pickling baths of brass industries, containing free sulphuric acid, zinc, copper, iron and other metallic salts, to prevent the contamination of streams, which consists in first treating the same with zinc skimmings from the brass mill, then adding metallic zinc, whereby copper is precipitated, then treating the liquor with an oxidizing agent and caustic soda to precipitate the remaining metals of the iron group, removing the precipitates to produce a purified zinc sulphate solution, adding barium sulphide to this purified zinc sulphate solution, and recovering from the liquor the sulphide of zinc and the sulphate of barium as lithopone.

In testimony whereof, I have hereunto set my hand.

JAMES A. NEWLANDS.